US005549267A

United States Patent [19]
Armbruster et al.

[11] Patent Number: 5,549,267
[45] Date of Patent: Aug. 27, 1996

[54] FRAME ASSEMBLY AND COMPOSITE INCLUSIVE THEREOF

[75] Inventors: June M. Armbruster, River Falls, Wis.; Willem V. Bastiaens, Medina, Minn.; Joseph P. Callahan, Jr., St. Paul, Minn.; Steve W. Moris, Woodbury, Minn.; David W. Stegink, Mendota Heights, Minn.

[73] Assignee: Minnesota Mining and Manufacturing Company, St. Paul, Minn.

[21] Appl. No.: 179,610

[22] Filed: Jan. 10, 1994

[51] Int. Cl.$^6$ ........................................... B41J 11/02
[52] U.S. Cl. ..................... 248/442.2; 248/918; D14/114
[58] Field of Search .................. 248/205.3, 442.2, 248/918, 174; 40/594, 124; 211/50; 434/365; 400/718; D14/114

[56] References Cited

U.S. PATENT DOCUMENTS

| | | | |
|---|---|---|---|
| 4,132,480 | 1/1979 | Reed | 40/159.2 X |
| 4,525,943 | 7/1985 | Iwata | 40/594 x |
| 4,632,471 | 12/1986 | Visnapuu | 248/442.2 X |
| 4,834,330 | 5/1989 | Swillinger | 248/918 X |
| 4,941,576 | 7/1990 | Sugarman et al. | 211/50 X |
| 5,032,436 | 7/1991 | Gustafson | 428/14 |
| 5,104,087 | 4/1992 | Wentzloff et al. | 248/442.2 |
| 5,328,145 | 7/1994 | Charapich | 248/442.2 |
| 5,398,905 | 3/1995 | Hinson | 248/918 X |

FOREIGN PATENT DOCUMENTS 2239119  6/1991  United Kingdom ................. 40/594

OTHER PUBLICATIONS

U.S. patent application No. 08/101,610 filed Aug. 3, 1993.
Advertising Brochure From Screenies, 19871 Sonoma Hwy, Sonoma, CA copyright 1993.
Commercial Literature identified as "CS-6009-92" from 3M Consumer Stationery Division, St. Paul, MN.
Copy of a page from "Colonial Garden Kitchesn" catalog dated 1991, Hanover, PA illustrating a corkboard frame.

Primary Examiner—Ramon O. Ramirez
Assistant Examiner—Derek J. Berger
Attorney, Agent, or Firm—Gary L. Griswold; Walter N. Kirn; William L. Huebsch

[57] ABSTRACT

A frame assembly for use on a device such a computer monitor having a front viewed surface surrounded by a housing. The frame assembly includes a stiff frame having generally planar front and rear surfaces that includes elongate border portions having inner edge surfaces that define an opening through the frame corresponding in shape to the front viewed surface. The rear surface of the frame can be attached along the front surface of the housing with the opening in the frame aligned with the front viewed surface, and a layer of repositionable pressure sensitive adhesive adhered to the frame is accessible along the front surface of the frame so that sheets of paper and other objects can be releasably adhered thereto. The frame assembly can be supplied as a part of a composite that can provide other separable smaller bulletin boards or frames that also can have pressure sensitive adhesive accessible along their front surfaces.

23 Claims, 7 Drawing Sheets

FRAME ASSEMBLY AND COMPOSITE INCLUSIVE THEREOF

FIELD OF THE INVENTION

This invention relates to frame assemblies, and in particular, to frame assemblies adapted for use around surfaces viewed by persons, such as around the monitor screen of a computer.

BACKGROUND ART

Frame assemblies are known for use on a computer monitor having display tube with a surface intended to be viewed by a user of the computer (called a "viewed surface" herein) and a housing having a front surface around and generally parallel with the viewed surface of the display tube. Such frame assemblies include that frame assembly sold under the trademark "Screenies" commercially available from Screenies L.P., Boyes Hot Springs, Calif., which frame assemblies generally includes a stiff frame having generally planar front and rear surfaces including rectangularly disposed elongate border portions disposed in a rectangular pattern, with inner edge surfaces of the border portions defining an opening through the frame corresponding to the size of the viewed surface. Means are provided for attaching the rear surface of the frame along the front surface of the housing with the opening in the frame aligned with the viewed surface. The frame may have a decorative front surface intended to enhance the appearance of the computer face, and the front surface of the frame may be provided by a material such as cork which allows sheets of paper and other objects to be releasably attached thereto with pins or tacks.

While such frame assemblies may be useful, they are not as easily used to support sheets of paper and other objects on their front surfaces as may be desired, and are adapted for only a single use (i.e., for use around the viewed surface or monitor screen of a computer).

DISCLOSURE OF THE INVENTION

The present invention comprises a frame assembly adapted for use around a viewed surface, such as the viewed surface on the display tube of a computer monitor, which frame assembly can easily support notes or papers along its front surface without the need for pins or tacks. The frame assembly can be provided alone, or, alternatively, the frame assembly can be provided in combination with a second assembly including a supplemental plate so that the composite of the frame assembly and the second assembly can provide a bulletin board-like structure, and after the second assembly is removed to afford placing the frame assembly around a viewed surface, the second assembly including the supplemental plate can be used for another purpose, such as a smaller bulletin board, or, if it is shaped for that purpose, as one or more smaller frame assemblies adapted for use around objects smaller than the viewed surface, such as photographs or telephone dials.

Generally, the frame assembly includes a stiff frame having generally planar front and rear surfaces, which frame includes elongate border portions having inner edge surfaces that define an opening through the frame corresponding in shape to at least a portion of the viewed surface around which the frame assembly is adapted to be used. Means are provided for attaching the rear surface of the frame along the front surface of the housing with the opening in the frame aligned with the viewed surface; and the frame assembly includes a layer of repositionable pressure sensitive adhesive adhered to the frame that has an attachment surface accessible along the front surface of the frame that is adapted to have sheets of paper and other objects releasably adhered thereto.

The layer of repositionable pressure sensitive adhesive can be adhered along the front surface of the frame, and can extend either over the entire front surface of the frame or over only one or more predetermined portions of the front surface of the frame.

Alternatively, the frame can comprise an outer layer providing the front surface of the frame and having through openings, and a recessed layer attached along a back surface of that outer layer and extending across the openings; and the layer of repositionable pressure-sensitive adhesive can be coated over the portions of the recessed layer extending across the openings. A portion of an item, such as a piece of paper, can be pressed into one or more of the openings to make contact with and become adhered to the layer of adhesive. The openings through the outer layer can be disposed in a decorative pattern along the front surface, and the front surface of the frame and the recessed layer or layer of adhesive extending across the openings can be of different colors.

Also, the frame assembly can further comprise a stack of sheets having decorative patterns on the front surfaces of the sheets and layers of repositionable pressure sensitive adhesive coated on the front surfaces of the sheets over the decorative patterns. In this embodiment, the sheets are adhered together in the stack with the sheets aligned and with rear surfaces of sheets in the stack removably adhered to the layers of repositionable pressure sensitive adhesive on the sheets. The rear surface of the bottom most sheet in the stack is adhered to the layer of repositionable pressure sensitive adhesive on the frame. The sheets can then be sequentially removed to present fresh layers of repositionable pressure sensitive adhesive on the sheets in the stack and/or to change the decorative pattern on the top sheet on the stack. Such decorative patterns on the sheets can be different and, for example, successive decorative patterns on the sheets in the stack can relate to successive events and/or seasons of the year.

Additionally, the frame assembly can further include a layer of transparent material attached to the frame and extending across the opening so that it will extend across a viewed surface around which the frame assembly is positioned. That layer of transparent material, for example, can provide along the viewed surface one or more of means for restricting glare, means for improving contrast, means for reducing static electricity, means for blocking certain types of radiation, and/or means for restricting viewing information displayed on the viewed surface at angles other than generally a right angle to the viewed surface.

When the frame assembly is provided as part of the composite described above rather than being provided alone, the stiff supplemental plate, which has generally planar front and rear surfaces and outer edge surfaces, is typically adapted to lay edge to edge with the inner edge surfaces of the border portions of the frame, and the composite can include means adapted for attaching the rear surface of the supplemental plate along a surface of a substrate, a layer of repositionable pressure sensitive adhesive adhered to the supplemental plate and having an attachment surface accessible along the front surface of the supplemental plate adapted to have sheets of paper and other objects releasably adhered thereto, and means for releasably attaching the supplemental plate to the frame with the front surfaces of the supplemental plate and the frame generally co-planar, and the outer edge surfaces of the supplemental plate laying edge to edge with the inner edge surfaces of the frame.

The layer of repositionable pressure sensitive adhesive on the supplemental plate can be disposed in any of the locations described above with respect to the frame, and the composite can include a stack of sheets like that described above for the frame both on the frame and on the supplemental plate.

The supplemental plate can be divided into two or more smaller strip portions included in smaller strip assemblies that are adapted to be separated from each other and from the frame assembly and to be used separately on substrates.

Alternatively, the supplemental plate can be provided with one or more smaller frame portions included in smaller frame assemblies that are adapted to frame surfaces with smaller areas (e.g., photographs or telephone dials) than the area of the viewed surface around which the first mentioned or main frame assembly is adapted to be used, but which smaller frame assemblies otherwise have structures similar to that of the main frame assembly. In that case the supplemental plate may include an insert portion that fills the potential opening in the innermost of the smaller frame portions in the same way the supplemental plate fills that opening in the frame.

BRIEF DESCRIPTION OF THE DRAWING

The present invention will be further described with reference to the accompanying drawing wherein, like parts are identified with like reference numerals in the several views, and wherein.

DESCRIPTION OF THE PREFERRED EMBODIMENTS

Figure 1:
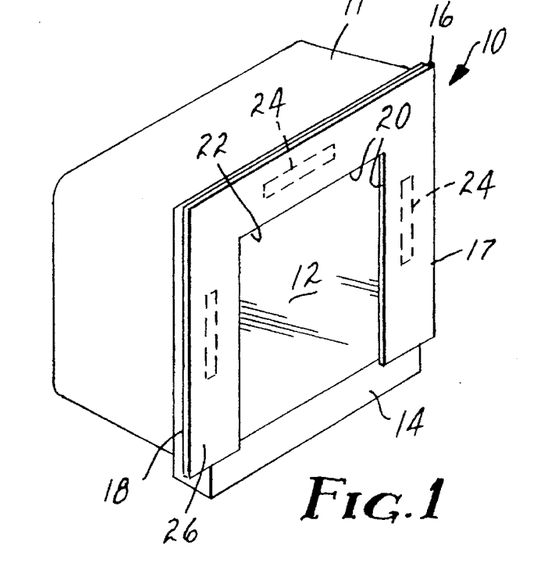
FIG. 1 is a perspective view of a first embodiment of a frame assembly according to the present invention attached to a computer monitor.
Figure 2:
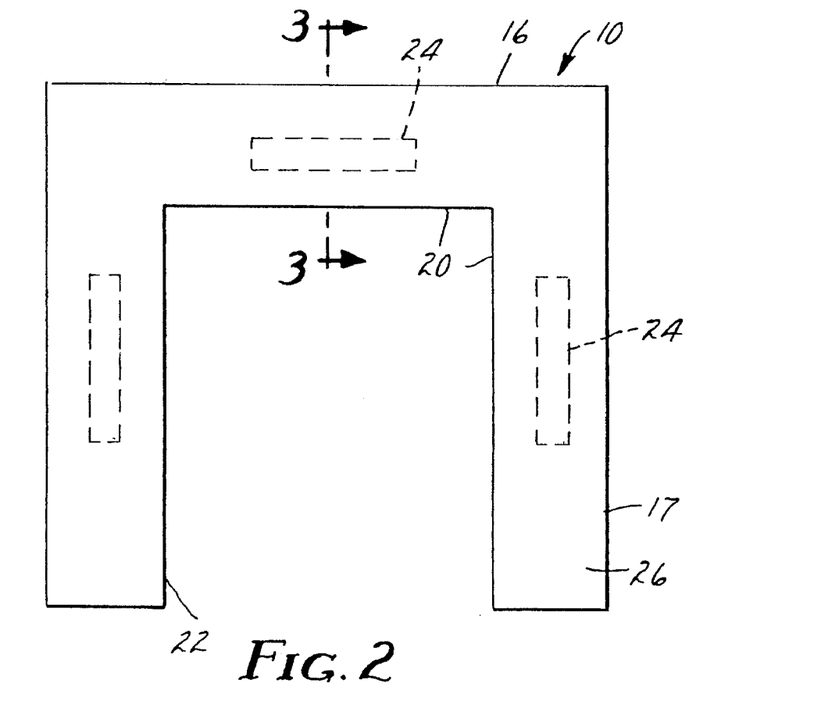
FIG. 2 is a front view of the frame assembly of FIG. 1.
Figure 3:
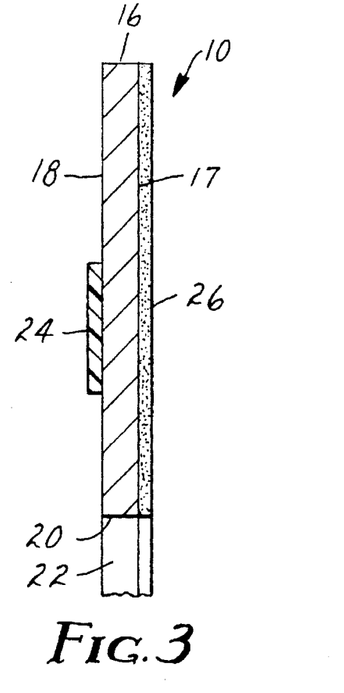
FIG. 3 is an enlarged fragmentary cross sectional view taken approximately along line 3—3 of FIG. 2.

Referring now to FIGS. 1, 2, and 3 of the drawing, there is illustrated a first embodiment of a frame assembly according to the present invention generally identified by the reference numeral 10. As is illustrated in FIG. 1, the frame assembly 10 is adapted for use on a computer monitor having a display tube with a rectangular front or "viewed" surface 12 adapted to be viewed by a user of the computer, which viewed surface 12 is generally planar and of a predetermined width and height. The computer monitor also has a housing having a front surface 14 around and generally parallel with the front viewed surface 12 of the display tube. The frame assembly 10 includes a stiff flexible frame 16 which can be made of heavy weight paperboard (e.g., 0.030 to 0.050 inch or 0.076 to 0.127 centimeter thick solid bleached sulfate paperboard such as that sold by Federal Paperboard, Montvale, N.J.) having generally planar front and rear surfaces 17 and 18 and including three elongate border portions disposed in a generally U-shaped pattern and having inner edge surfaces 20 also disposed in generally a U-shaped pattern. The inner edge surfaces 20 define a generally U-shaped opening 22 through the frame 16 of a width generally corresponding to or slightly greater than the width of the front viewed surface 12 on the display tube in the computer monitor. Means in the form of strips 24 of releasably mating hook and loop fastener material or of foam tape coated on opposite sides with pressure sensitive adhesive are provided for attaching the rear surface 18 of the frame 16 along the front surface 14 of the housing with the opening 22 in the frame 16 aligned with the front viewed surface 12 of the display tube. A layer 26 of repositionable pressure sensitive adhesive is adhered to and entirely over the front surface 17 of the frame 16, and has an exposed attachment surface opposite and accessible along the front surface 17 of the frame 16 that is adapted to have sheets of paper and other objects releasably adhered thereto.

Figure 4:
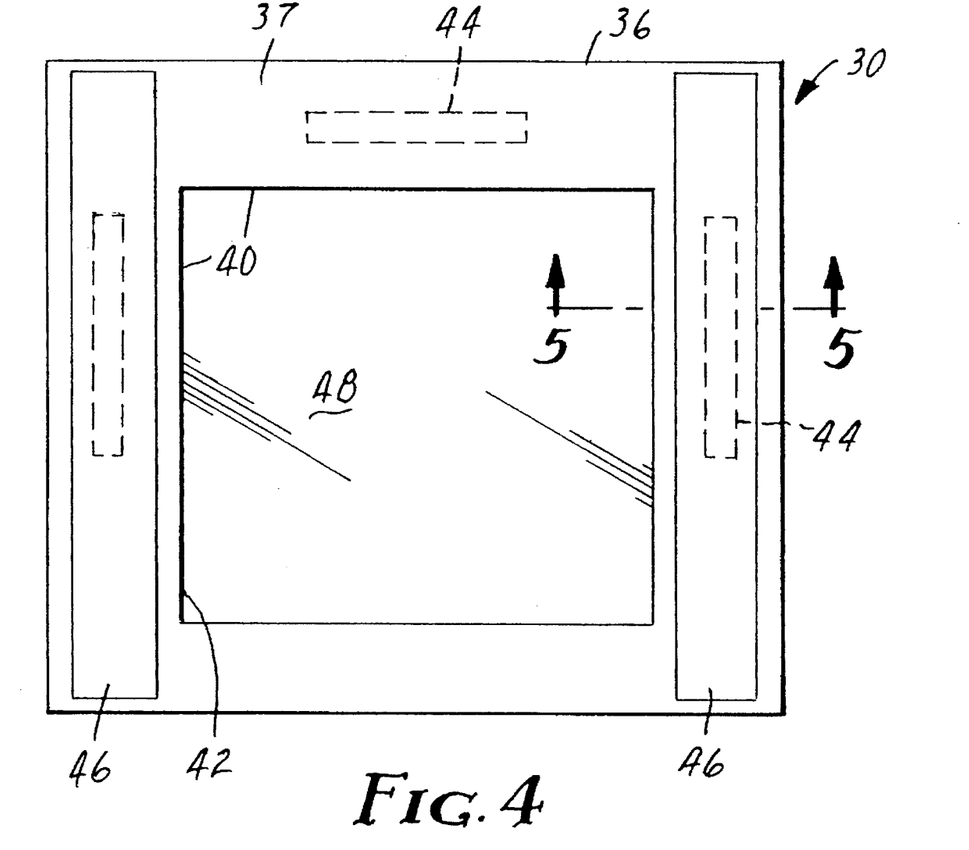
FIG. 4 is a front view of a second embodiment of a frame assembly according to the present invention.
Figure 5:
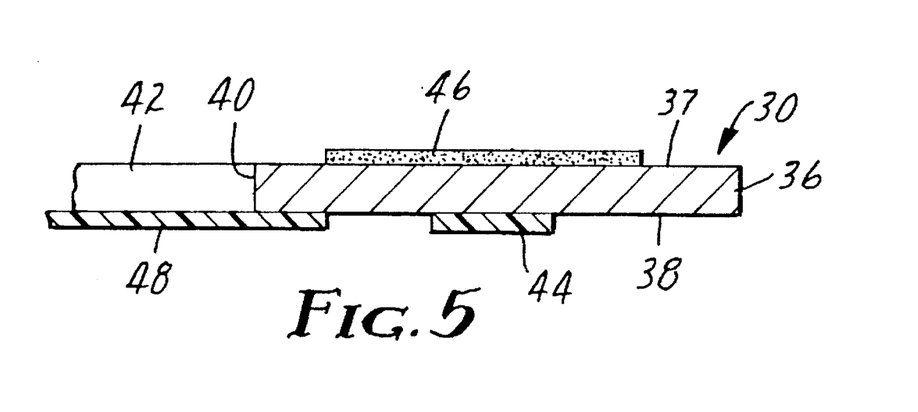
FIG. 5 is an enlarged fragmentary cross sectional view taken approximately along line 5—5 of FIG. 4.

Referring now to FIGS. 4 and 5 of the drawing, there is illustrated a second embodiment of a frame assembly according to the present invention generally identified by the reference numeral 30. Like the frame assembly 10, the frame assembly 30 is adapted for use on a computer monitor 11 of the type illustrated in FIG. 1 which has a display tube with a rectangular front viewed surface 12 that is generally planar and of a predetermined width and height, and a housing having a front surface 14 around and generally parallel with the front viewed surface 12 of the display tube. The frame assembly 30 includes a stiff frame 36 (e.g., of heavy weight paperboard) having generally planar front and rear surfaces 37 and 38 and including four generally elongate border portions disposed in a generally rectangular pattern and having inner edge surfaces 40 also disposed in generally a rectangular pattern. The inner edge surfaces 40 define a generally rectangular opening 42 through the frame 36 having a width and height generally corresponding or slightly greater than to the width and height of the front viewed surface 12 on the display tube in the computer monitor 11. Means in the form of strips 44 of releasably mating hook and loop fastener material or of foam tape coated on opposite sides with pressure sensitive adhesive are provided for removably attaching the rear surface 38 of the frame 36 along the front surface 14 of the housing with the opening 42 in the frame 36 aligned with the front viewed surface 12 of the display tube. A layer 46 of repositionable pressure sensitive adhesive is adhered along only predetermined spaced portions of the front surface 37 of the frame 36 (e.g., as illustrated only in vertical strips along its opposite edges), and has an exposed attachment surface opposite and accessible along the front surface 37 of the frame 36 that is adapted to have sheets of paper and other objects releasably adhered thereto.

Optionally, either the frame assembly 10 or the frame assembly 30 can further include a layer 48 of transparent material (illustrated only on the frame assembly 30) attached to one of the major surfaces of the frame 36 (e.g., the rear surface as illustrated, or alternatively to its front surface) and extending across the opening 42 defined by the edge surfaces 40. The layer 48 of transparent material can, for example, be any one of the types of "Computer Filters"0 available from the Data Storage Products Division of Minnesota Mining and Manufacturing Company, St. Paul, Minn., which can include one or more of means for restricting glare, means for improving contrast, means for reducing static electricity, means for blocking certain types of radiation along the viewed surface 12 of the display tube around which the frame assembly 30 is positioned, and/or means for restricting viewing information displayed on the viewed surface 12 at angles other than generally a right angle to the viewed surface 12.

Figure 6:
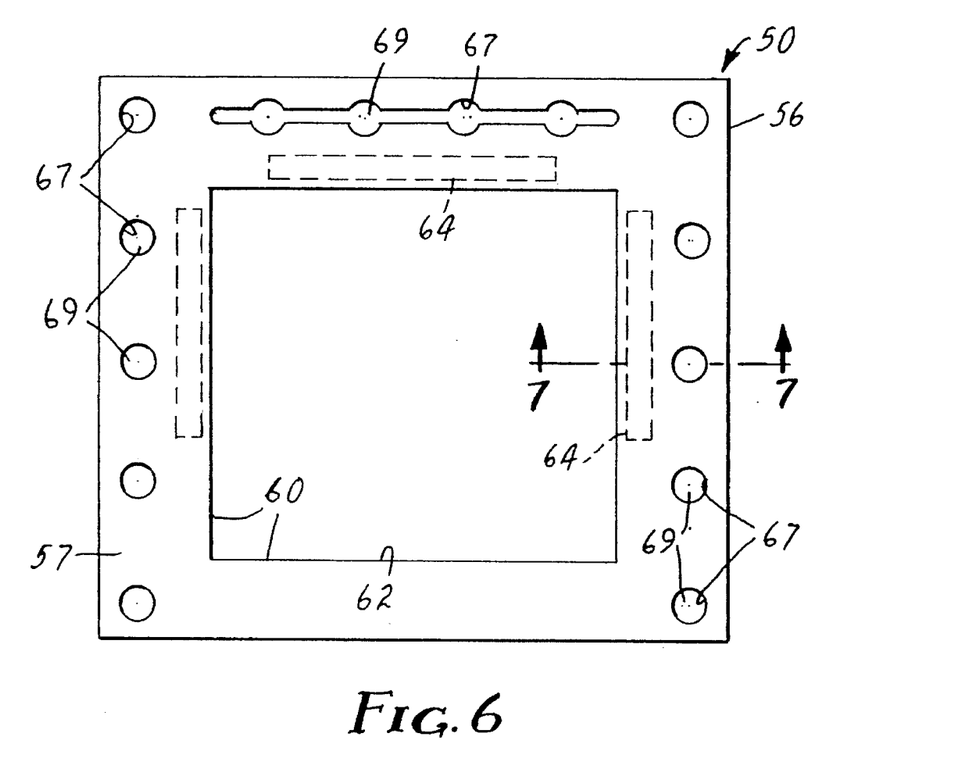
FIG. 6 is a front view of a third embodiment of a frame assembly according to the present invention.
Figure 7:
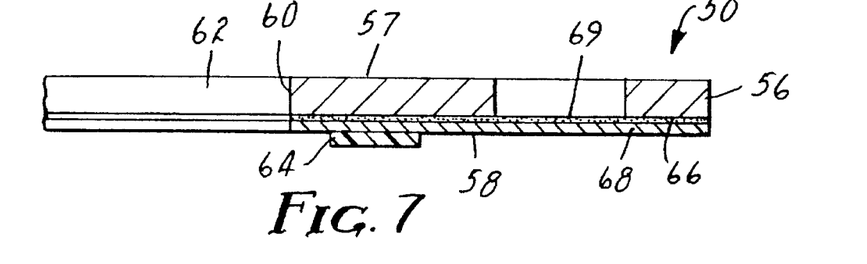
FIG. 7 is an enlarged fragmentary cross sectional view taken approximately along line 7—7 of FIG. 6.

Referring now to FIGS. 6 and 7 of the drawing, there is illustrated a third embodiment of a frame assembly according to the present invention generally identified by the reference numeral 50. The frame assembly 50 is also adapted for use on a computer monitor like that illustrated in FIG. 1 which has a display tube with a rectangular front viewed surface 12 which is generally planar and of a predetermined width and height, and a housing having a front surface 14 around and generally parallel with the front viewed surface 12 of the display tube. The frame assembly 50 includes a stiff frame 56 (e.g., of heavy weight paperboard) having generally planar front and rear surfaces 57 and 58 and including four elongate border portions disposed in a generally rectangular pattern and having inner edge surfaces 60 also disposed in generally a rectangular pattern. The inner edge surfaces 60 define a generally rectangular opening 62 through the frame 56 of a width and height generally corresponding to or slightly greater than the width and height of the front viewed surface 12 on the display tube of the computer monitor. Means in the form of strips 64 of releasably mating hook and loop fastener material or of foam tape coated on opposite sides with pressure sensitive adhesive are provided for attaching the rear surface 58 of the frame 56 along the front surface 14 of the housing with the opening 62 in the frame 56 aligned with the front viewed surface 12 of the display tube.

As is best seen in FIG. 7, the frame 56 comprises a stiff outer layer 65 providing the front surface 57 of the frame 56, which outer layer 65 has a back surface 66 opposite the front surface 57 and has through openings 67. The frame 56 also comprises a recessed layer 68 attached along the back surface 66 of the outer layer and extending across the openings 67. A layer 69 of repositionable pressure-sensitive adhesive is coated over the recessed layer 68 including over the portions of the recessed layer 68 extending across the openings 67. As an example, the outer layer 65 can be of any paper stock of up to about 0.125 inch or 0.318 centimeter thick, and the recessed layer 68 can be of material that can be adhesive coated. This arrangement affords secure attachment of papers and other objects that can be flexed sufficiently to press them into engagement with those portions of the layer 69 of pressure sensitive adhesive extending across the openings 67, and, because it is recessed, affords some protection for the layer 69 of adhesive when it is not in use to hold sheets of paper or other objects. As illustrated, the openings 67 through the outer layer 65 can be disposed in a decorative pattern along the front surface 57. Optionally, if desired to produce a further decorative effect, the front surface 57 of the frame 56 and the recessed layer 68 and/or the layer 69 of pressure sensitive adhesive extending across the openings 67 can be of different colors.

Figure 8:
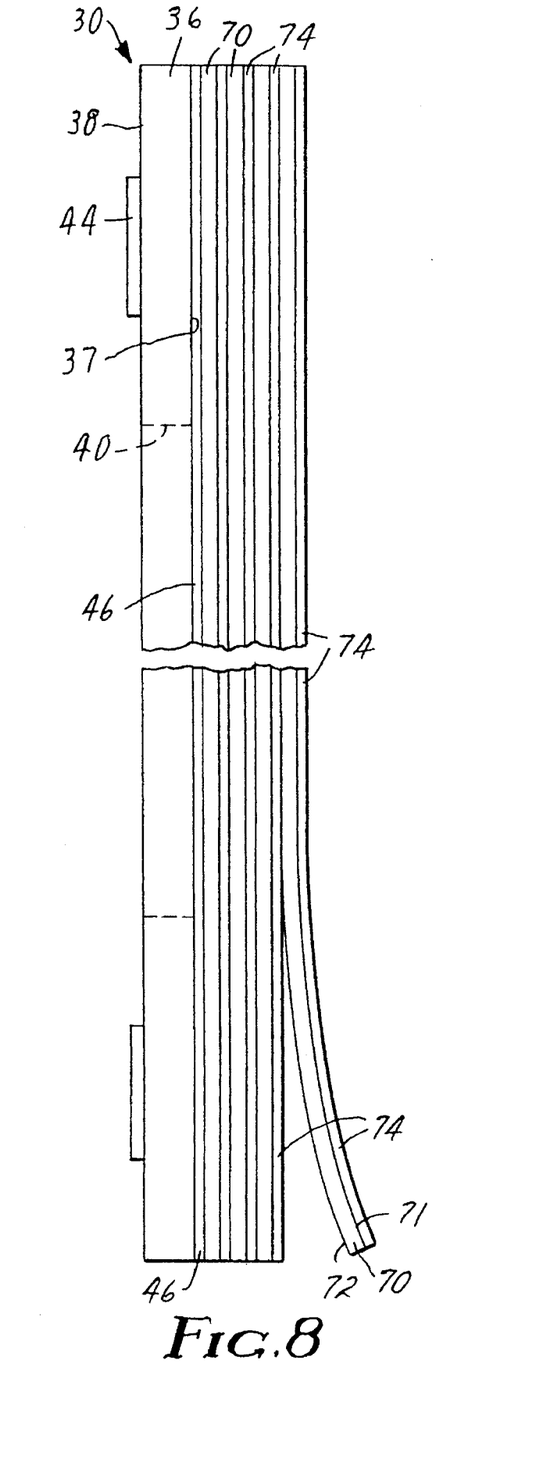
FIG. 8 is an enlarged fragmentary edge view of a fourth embodiment of a frame assembly according to the present invention.

As is illustrated in FIG. 8, the frame assembly 30, (or optionally, though not illustrated, the frame assembly 10) can further comprise a plurality of paper sheets 70 having front and rear major surfaces 71 and 72; decorative patterns (not shown) on the front surfaces 71 of the sheets 70; and layers 74 of transparent repositionable pressure sensitive adhesive coated on the front surfaces 71 of the sheets 70 over the decorative patterns. The sheets 70 can be adhered together in a stack with the sheets 70 aligned and with rear surfaces 72 of sheets 70 in the stack removably adhered to the layers 74 of repositionable pressure sensitive adhesive on the sheets 70; and the rear surface 72 of the bottom most sheet in the stack can be releasably adhered to the layer 46 of repositionable pressures sensitive adhesive on the front surface 37 of the frame 36. The sheets 70 can be sequentially removed from time to time to present fresh layers 74 of repositionable pressure sensitive adhesive on the sheets 70 in the stack and/or to change the decorative pattern on the top sheet 70 on the stack. The decorative patterns on the sheets 70 can be the same, or can all be different. As an example, successive decorative patterns on the sheets 70 in the stack can relate to successive events and/or seasons of the year (e.g., spring, summer, fall, winter; or presidents day, valentines day, the fourth of July, etc.).

Figure 8A:
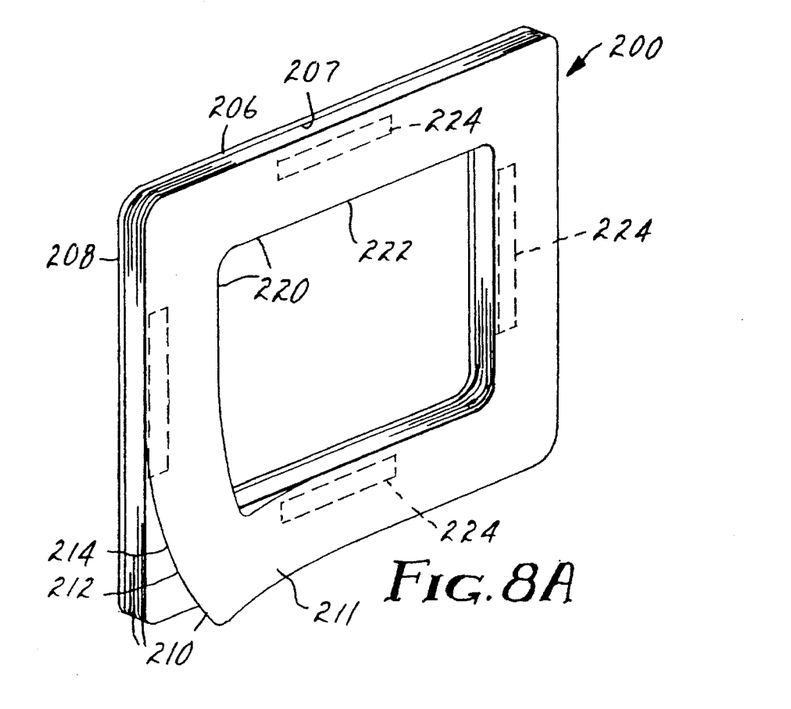
FIG. 8A is a perspective view of a modification of the fourth embodiment of the frame assembly illustrated in FIG. 8, in which a corner of one of a stack of sheets in the frame assembly has been pealed away from the stack.

Referring now to FIG. 8A of the drawing, there is illustrated a modification of the frame assembly embodiment illustrated in FIG. 8 that is generally identified by the reference numeral 200. Like the other frame assemblies described above, the frame assembly 200 is adapted for use on a computer monitor 11 of the type illustrated in FIG. 1 which has a display tube with a rectangular front viewed surface 12 that is generally planar and of a predetermined width and height, and a housing having a front surface 14 around and generally parallel with the front viewed surface 12 of the display tube. The frame assembly 200 includes a frame 206 which could either be of heavy weight paperboard or of paper and which has generally planar front and rear surfaces 207 and 208; and a plurality of sheets 210 having front and rear major surfaces 211 and 212 and layers 214 of repositionable pressure sensitive adhesive coated on the rear surfaces 12 of the sheets 210 adhering the sheets 210 together in a stack with the sheets 210 aligned and with the layers of adhesive on the rear surfaces 212 of the sheets 210 in the stack removably adhered to the front surfaces 211 of the underlying sheets 210 in the stack. The layer 214 of adhesive on the rear surface 212 of the bottom most sheet 210 in the stack is releasably adhered to the front surface 207 of the frame 206. Both the frame 206 and each of the sheets 210 include four generally elongate border portions disposed in a generally rectangular pattern and having inner edge surfaces 220 also disposed in generally a rectangular pattern. The inner edge surfaces 220 define a generally rectangular opening 222 through the frame 206 and the stack of sheets 210 that has a width and height generally corresponding to or slightly greater than the width and height of the front viewed surface 12 on the display tube in the computer monitor 11. Means that could be in the form of strips 224 of releasably mating hook and loop fastener material or of foam tape coated on opposite sides with pressure sensitive adhesive (or in the alternative, if the frame 206 is of paper, a layer of pressure sensitive adhesive on the rear surface 208 of the frame 206) are provided for removably attaching the rear surface 208 of the frame 206 along the front surface 14 of the housing with the opening 222 in the frame 206 aligned with the front viewed surface 12 of the display tube. The outer surfaces of some or all of the sheets 210 can be (1) plain or undecorated and adapted to be written on to provide notes for the computer user, (2) can have portions that are decorated, and other portions that are plain or undecorated and can be written on, or (3) can be entirely decorated. The patterns on partially or fully decorated sheets can be the same, or can be different, and can relate to successive events and/or seasons of the year. Alternatively, though not illustrated, both the frame 206 and each of the sheets 210 could include three generally elongate border portions disposed in a generally U-shaped pattern and having inner edge surfaces also disposed in generally a U-shaped pattern similar to that illustrated for the frame 16 in FIGS. 1, 2 and 3.

Figure 9:
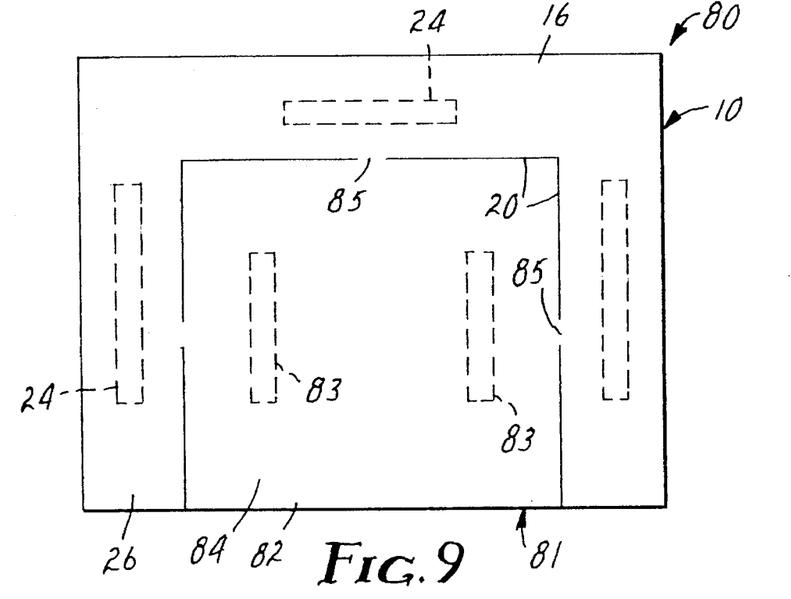
FIG. 9 is a front view of a first embodiment of a composite according to the present invention that includes the frame assembly of FIGS. 1, 2 and 3.
Figure 10:
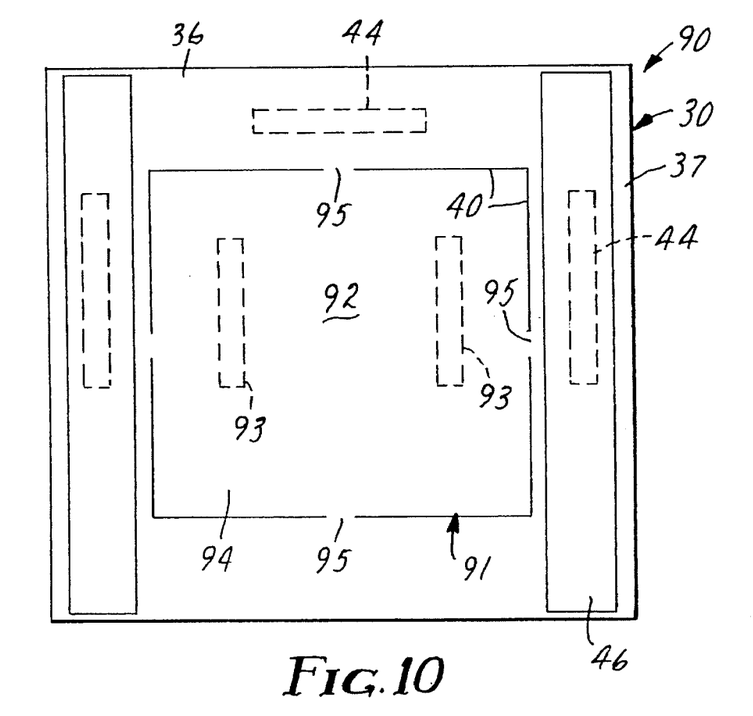
FIG. 10 is a front view of a second embodiment of a composite according to the present invention that includes the frame assembly of FIGS. 4 and 5.
Figure 11:
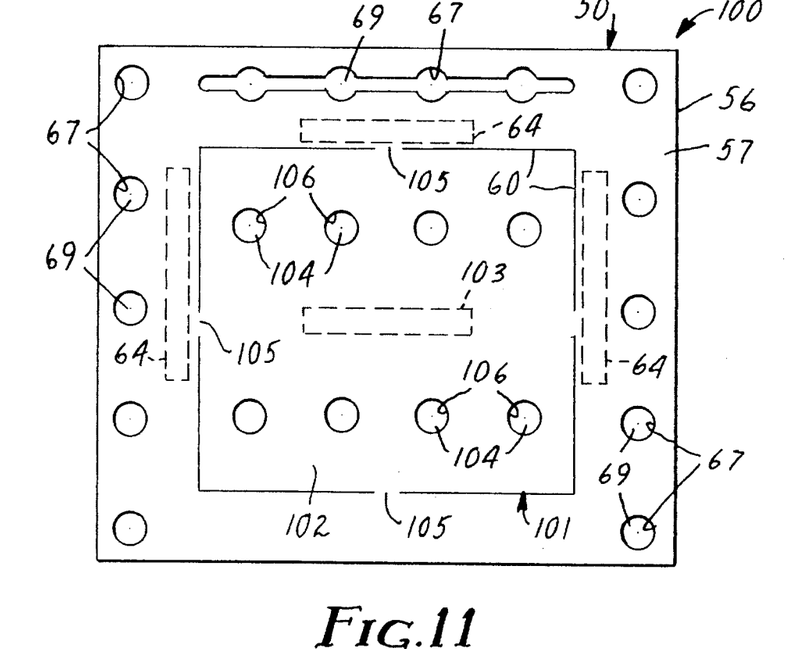
FIG. 11 is a front view of a third embodiment of a composite according to the present invention first that includes the frame assembly of FIGS. 6 and 7.

As illustrated respectively in FIGS. 9, 10, or 11, the frame assemblies 10, 30, or 50 can be included in a composite 80, 90, or 100 which further includes a second assembly 81, 91, or 101. Those second assemblies 81, 91, or 101 can each include a stiff supplemental plate 82, 92, or 102 respectively, each of which supplemental plates 82, 92 or 102 has generally planar major front and rear surfaces. Each of the supplemental plates 82, 92, or 102 has outer edge surfaces adapted to lay edge to edge with the inner edge surfaces 20, 40, or 60 of the border portions on the frames, and a layer 84, 94, or 104 of repositionable pressure sensitive adhesive adhered to the supplemental plate 82, 92, or 102 and having an attachment surface accessible along the front surface of the supplemental plate 82, 92, or 102 adapted to have sheets of paper and other objects releasably adhered thereto. Optionally, the supplemental plates 82, 92 and 102 can also include means such as strips 83, 93 or 103 of releasably mating hook and loop fastener material or of foam tape coated on opposite sides with pressure sensitive adhesive that are adapted for attaching their rear surfaces along a surface of a substrate. Each of the composites 80, 90, or 100 includes means for releasably attaching the supplemental plate 82, 92 or 102 to the frame 16, 36 or 56 with the front surfaces of the supplemental plate 82, 92, or 102 and the frame 16, 36, or 56 generally co-planar, and the outer edge surfaces of the supplemental plate 82, 92, or 102 laying edge to edge with the inner edge surfaces 20, 40, or 60 of the frame 16, 36, or 56. That means for releasably attaching can be provided by forming the supplemental plate 82, 92, or 102 and frame 16, 36, or 56 from a single sheet of material and slitting that single sheet between the plate 82, 92 or 102 and frame 16, 36, or 56 while leaving a few spaced tabs 85, 95, or 105 of material therebetween that will provide an attachment therebetween until the tabs 85, 95, or 105 are manually broken or cut to separate the plate 82, 92 or 102 and the frame 16, 36, or 56.

As with the frame assemblies 10 and 30 described above, the layers 84 and 94 of repositionable pressure sensitive adhesive on the composites 80 and 90 can be adhered along the front surfaces of the frame 10 or 30 and supplemental plate 82 or 92 and extend over the entire front surfaces of the frame 10 and the supplemental plate 82; or can extend over only predetermined portions of the front surfaces of the frame 30 and the supplemental plate 92. Also, as in the frame assembly 50, both the frame 56 and the supplemental plate 102 in the composite 100 can comprise outer layers 65 and 105 providing the front surfaces of the frame 56 and the supplemental plate 102, have back surfaces opposite the front surfaces, and have through openings 67 and 106, recessed layers 68 and 107 attached along their back surfaces and extending across the openings 67 and 106, and the layers 69 and 104 of repositionable pressure-sensitive adhesive can be on the portions of the recessed layers 68 and 107 extending across the openings 67 and 106. Also, the openings 67 and 106 through the outer layers 65 and 105 of both the frame 56 and the supplemental plate 102 can be disposed in a decorative pattern along their front surfaces, and the front surfaces of the frame 56 and the supplemental plate 102 and the recessed layers 68 and 107 or layers 69 and 104 of pressure sensitive adhesive extending across the openings 67 and 106 can be of different colors.

Also, while not illustrated, either or both of the frame assemblies 10 or 30 and the second assembly 81 or 91 can both further comprise a stack of sheets like the stack of sheets 70 described above for the frame assembly 30, which sheets are adhered together in the stacks with the sheets aligned and with rear surfaces of sheets in the stacks removably adhered to the layers of repositionable pressure sensitive adhesive on the sheets; and the rear surfaces of the bottom most sheets in the stacks can be releasably adhered to the layers 26 or 46 and 84 or 94 of repositionable pressure sensitive adhesive on the front surfaces of the frame 16 or 36 and the supplemental plate 82 or 92. Also, if desired, the frame assembly 10 or 30 in the composite 80 or 90 can include the layer of transparent material 48 (not illustrated) which will be attached to the frame 16 or 36 and will extend across the front surface or the rear surface of the supplemental plate 82 or 92.

Figure 12:
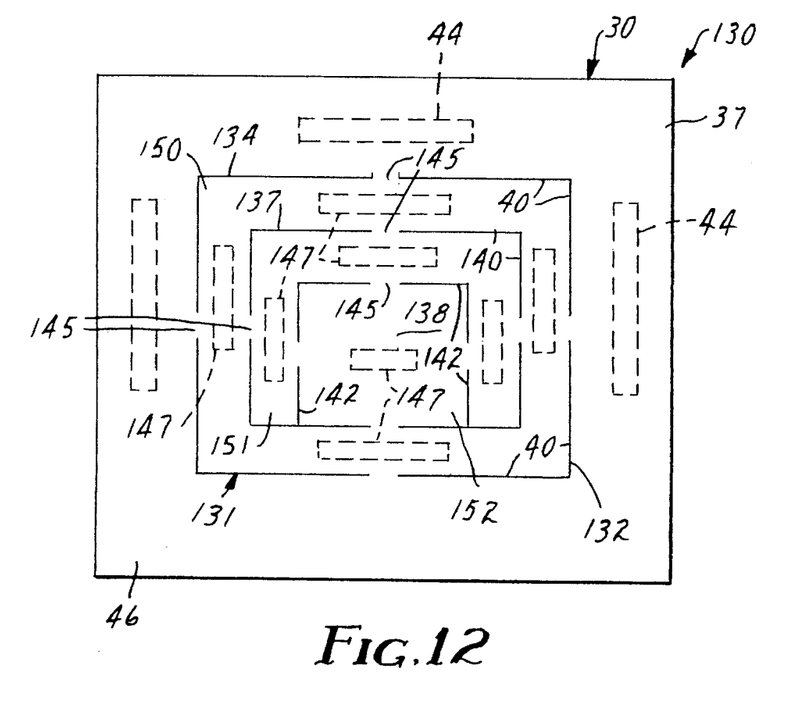
FIG. 12 is a front view of a fourth embodiment of a composite according to the present invention that includes the frame assembly of FIGS. 4 and 5.

As is illustrated in FIG. 12 for the frame assembly 30, any one of the frame assemblies 10, 30, or 50 can also be included in a composite such as the composite 130 that further comprises a second assembly 131 including a supplemental plate 132, in which the supplemental plate 132, instead of being a continuous layer as are the supplemental plates 82, 92, and 102, includes at least one, or as illustrated, two (i.e., outer and inner) smaller frame portions 134 and 137 of decreasing sizes included in frame assemblies that are smaller than the frame assembly 30, together with an insert portion 138. The outer smaller frame portion 134 includes four elongate border portions each having an inner edge surface 140, and the inner smaller frame portion 137 includes three elongate border portions each having an inner edge surface 142. The edge surfaces 140 and 142 respectively are adapted to define, when the frame assemblies in the composite 130 are separated, openings of predetermined shapes and sizes through the outer and inner smaller frame portions 134 and 137. The outer and inner smaller frame portions 134 and 137 and the insert portion 138 have generally planar front and rear surfaces. The insert portion 138 has outer edge surfaces adapted to lay edge to edge with the inner edge surfaces 140 and 142 of the outer and inner smaller frame portions 134 and 137; the inner smaller frame portion 137 has outer edge surfaces adapted to lay edge to edge with the inner edge surface 140 of the outer smaller frame portion 134; and the outer smaller frame portion 134 has outer edge surfaces adapted to lay edge to edge with the inner edge surfaces 40 of the frame 37. Means in the form of tabs 145 are provided for releasably attaching the outer and inner smaller frame portions 134 and 137 and the insert portion 138 together and to the frame 37 with their front and rear surfaces generally co-planar, and with their edge surfaces laying edge to edge in the relationship described above. Means in the form of strips 147 of the type described above can be provided that are adapted for attaching the rear surfaces of the outer and inner smaller frame portions 134 and 137 and of the insert portion 138 along surfaces of substrates; and layers 150, 151, and 152 of repositionable pressure sensitive adhesive can be adhered respectively to the outer surfaces of the outer and inner smaller frame portions 134 and 137 and of the insert portion 138 so as to provide attachment surfaces accessible along their front surfaces in the manner described above so that sheets of paper and other objects can easily be releasably adhered thereto. The outer and inner smaller frame portions 134 and 137 can be sized to be suitable, when the frame assemblies in the composite 130 are separated from each other, for framing photographs or phone dials, etc., and the insert portion 138, when separated from the other portions of the composite 130, might, for example, be useful on a vertical surface such as that of a refrigerator to hold small pieces of paper such as receipts or grocery lists.

Figure 13:
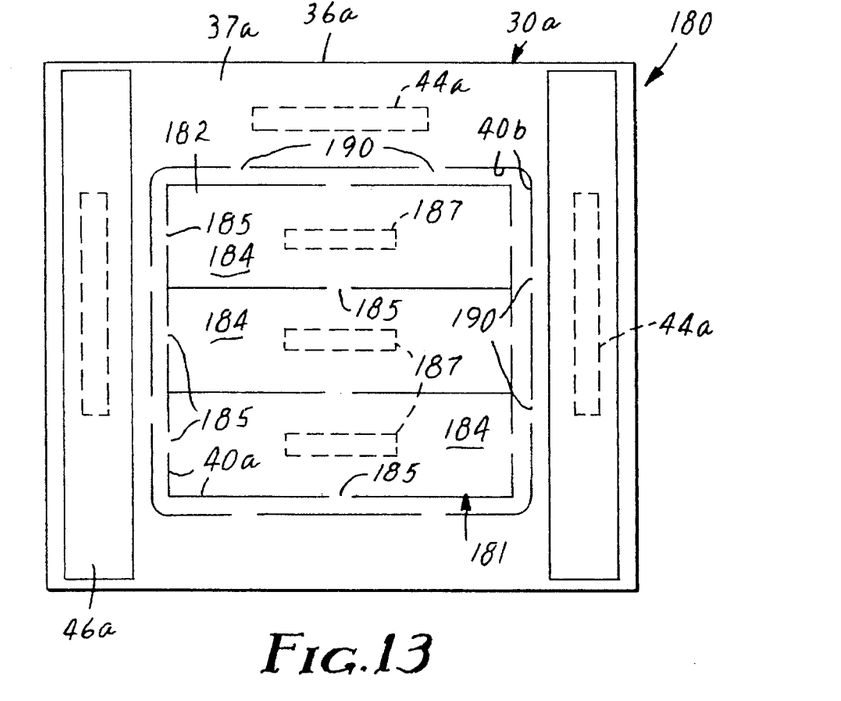
FIG. 13 is a front view of a fifth embodiment of a composite according to the present invention that includes the frame assembly of FIGS. 4 and 5.

As is illustrated in FIG. 13 for a frame assembly 30*a* (which frame assembly 30*a* has generally the same parts as the frame assembly 30, with similar parts having the same reference numerals to which has been added the suffix "a"), any one of the frame assemblies 10, 30, or 50 can also be included in a composite such as the composite 180 that further comprises a second assembly 181 including a supplemental plate 182, in which the supplemental plate 182, instead of being a continuous layer as are the supplemental plates 82, 92, and 102, includes at least two, or as illustrated, three elongate strip portions 184. The strip portions 184 have generally planar front and rear surfaces, and have edge surfaces adapted to lay edge to edge with each other and the inner edge surfaces 40*a* of the frame 36*a*. Means in the form of tabs 185 are provided for releasably attaching the strip portions 184 together and to the frame 36*a* with their front and rear surfaces generally co-planar, and with their edge surfaces laying edge to edge in the relationship described above. Means in the form of strips 187 of the type described above can be provided that are adapted for attaching the rear surfaces of the strip portions 184 along surfaces of substrates; and layers of repositionable pressure sensitive adhesive can be adhered to the outer surfaces of the strip portions 184 so as to provide attachment surfaces accessible along their front surfaces in the manner described above so that sheets of paper and other objects can easily be releasably adhered thereto. The strip portions 184, when separated from each other and from the frame assembly 30*a* of the composite 180, might, for example, be useful on a vertical surface such as that of a refrigerator to hold small pieces of paper such as receipts or grocery lists.

Also, the frame 36*a* of the frame assembly 30*a* included in the composite 180 can be slit one, two or even more times in a generally rectangular pattern around the slit that defines the inner edge surfaces 40*a* (only one such slit being illustrated) to define outer edge surfaces 40*b* defining a larger opening than the first opening that is defined by the edge surfaces 40*a*; thereby giving the user the option to form different size openings in the frame 36*a* to accommodate different sized viewed surfaces. As with the slit that defines the edge surfaces 40*a*, the slit forming the outer edge surfaces 40*b* is not continuous so that a few spaced tabs 190 provide means for separably attaching the portion of the frame 36*a* around the outer edge surfaces 40*b* and the portion of the frame between the outer edge surfaces 40*b* and the inner edge surfaces 40*a* until (if ever) those tabs 190 are manually broken or cut so that the edge surfaces 40*b* define the opening in the frame 36*a*.

Part or all of the outer surfaces on any of the frame assemblies 10, 30 or 50 or on any of the composites 80, 90, 100, 130, or 180 can be partially or fully printed or decorated as desired. Such decoration may take the form of graphics, artwork or designs and may be applied by printing, embossing or laminations. The printing may include useful information such as periodic tables, conversion tables, software program information, emergency information, phone numbers, calendars, etc. Also, pockets that can receive and allow notes, business cards or pictures to be viewed along those outer surfaces may be formed by adhering or otherwise attaching transparent film to those outer surfaces, or such objects can be similarly attached along such outer surfaces by sheets of transparent polymeric film coated with a transparent repositionable pressure sensitive adhesive that can be attached over and to the objects and to the outer surfaces around their peripheries, which sheets could be attached along one edge to the outer surfaces. Also, portions of those outer surfaces that are not coated with pressure sensitive adhesive could be adapted to be written on with dry erase markers, or with conventional pens or pencils.

The adhesive used in the repositionable (i.e., repetitively usable) layer of pressure-sensitive adhesive layer on any of the frame assemblies 10, 30 or 50 or on any of the portions of the composites 80, 90, 100, 130, or 180 described herein should be of a type that can have articles such as sheets of paper repeatedly adhered to and removed from it without a substantial loss of adhesion capability. Pressure sensitive adhesives having such repositionable or repetitively usable properties are disclosed in U.S. Pat. Nos. 3,691,140 (Silver), U.S. Pat. No. 4,166,152 (Baker et al), U.S. Pat. No. 4,786,696 (Bohnel), and U.S. patent application Ser. No. 07/816,593 that is assigned to the assignee of the subject application, the content of which patents and patent application are hereby incorporated herein by reference.

The present invention has now been described with reference to several embodiments thereof. It will be apparent to those skilled in the art that many changes can be made in the embodiments described by interchanging of parts or otherwise without departing from the scope of the present invention. Also, the frame assemblies described above may have many other uses than around the viewed surface of a display tube on a computer monitor. Thus, the scope of the present invention should not be limited to the structures described in this application, but only by the structures described by the language of the claims and the equivalents thereof.

We claim:

1. A frame assembly adapted for use on a device including a front viewed surface of a predetermined shape and a housing having a front surface at least partially around the viewed surface, said frame assembly including:

a frame having generally planar front and rear surfaces, said frame including elongate border portions having inner edge surfaces defining a first opening through the frame corresponding in shape to at least a portion of the front viewed surface of the device on which the frame is adapted to be used;

means for attaching the rear surface of the frame along the front surface of the housing on which the frame is adapted to be used with the opening in the frame aligned with the front viewed surface of the device on which the frame is adapted to be used; and a layer of repositionable pressure sensitive adhesive adhered to said frame, said layer having an attachment surface accessible along the front surface of the frame adapted to have sheets of paper and other objects releasably adhered thereto;

said frame comprising:

a stiff outer layer providing the front surface of the frame, said outer layer having a back surface opposite said front surface and having through openings; and a recessed layer attached along the back surface of said outer layer and extending across said openings; and said layer of repositionable pressure-sensitive adhesive being coated over the portions of said recessed layer extending across the openings.

2. A frame assembly according to claim 1, wherein said openings through said outer layer are disposed in a decorative pattern along said front surface, and said front surface of said frame and said recessed layer or layer of adhesive extending across said openings are of different colors.

3. A frame assembly adapted for use on a device including a front viewed surface of a predetermined shape and a housing having a front surface at least partially around the viewed surface, said frame assembly including:

a frame having generally planar front and rear surfaces, said frame including elongate border portions having inner edge surfaces defining a first opening through the frame corresponding in shape to at least a portion of the front viewed surface of the device on which the frame is adapted to be used;

means for attaching the rear surface of the frame along the front surface of the housing on which the frame is adapted to be used with the opening in the frame aligned with the front viewed surface of the device on which the frame is adapted to be used; and a layer of repositionable pressure sensitive adhesive adhered to said frame, said layer having an attachment surface accessible along the front surface of the frame adapted to have sheets of paper and other objects releasably adhered thereto;

said layer of repositionable pressure sensitive adhesive being adhered along the front surface of the frame, and said frame assembly further comprising:

a plurality of sheets having from and rear major surfaces and generally the same shape as said frame;

decorative patterns on the from surfaces of said sheets; and layers of repositionable pressure sensitive adhesive coated on the front surfaces of said sheets over said decorative patterns;

said sheets being adhered together in a stack with the sheets aligned and with rear surfaces of sheets in the stack removably adhered to the layers of repositionable pressure sensitive adhesive on the sheets; and the rear surface of the bottom most sheet in the stack being releasably adhered to the repositionable pressure sensitive adhesive on the front surface of the frame;

said sheets being sequentially removable to present fresh layers of repositionable pressure sensitive adhesive on the sheets in the stack and/or to change the decorative pattern on the top sheet on the stack.

4. A frame assembly according to claim 3 wherein said decorative patterns on said sheets are different.

5. A frame assembly according to claim 3 wherein successive decorative patterns on said sheets in said stack relate to successive events and/or seasons of the year.

6. A frame assembly adapted for use on a device including a from viewed surface of a predetermined shape and a housing having a front surface at least partially around the viewed surface, said frame assembly including:

a frame having generally planar front and rear surfaces, said frame including elongate border portions having inner edge surfaces defining a first opening through the frame corresponding in shape to at least a portion of the front viewed surface of the device on which the frame is adapted to be used;

means for attaching the rear surface of the frame along the front surface of the housing on which the frame is adapted to be used with the opening in the frame aligned with the front viewed surface of the device on which the frame is adapted to be used; and a layer of repositionable pressure sensitive adhesive adhered to said frame, said layer having an attachment surface accessible along the front surface of the frame adapted to have sheets of paper and other objects releasably adhered thereto;

said frame being slit at least once around said inner edge surfaces defining said first opening through the frame to define outer edge surfaces defining a larger opening than said first opening; and said frame further including means for separably attaching the portion of the frame around said outer edge surfaces and the portion of the frame between said outer edge surfaces and said inner edge surfaces, thereby affording the forming of different size openings in the frame to afford adoption of the frame assembly to devices having different sized viewed surfaces.

7. A frame assembly adapted for use on a device including a front viewed surface of a predetermined shape and a housing having a front surface at least partially around the viewed surface, said frame assembly including:

a frame having generally planar front and rear surfaces, a plurality of sheets having front and rear major surfaces;

layers of repositionable pressure sensitive adhesive coated on the rear surfaces of said sheets;

said sheets being adhered together in a stack with the sheets aligned and with the layers of repositionable pressure sensitive adhesive on the rear surfaces of the sheets removably adhered to the from surfaces of the sheets in the stack;

the layer of repositionable pressure sensitive adhesive on the rear surface of the bottom most sheet in the stack being releasably adhered to the front surface of the frame;

said frame and sheets each including elongate border portions having inner edge surfaces defining an opening through the frame and stack of sheets adapted to generally correspond in shape to or to be slightly larger than at least a portion of the from viewed surface of the device on which the frame is adapted to be used; and means adapted for attaching the rear surface of the frame along the front surface of the housing of the device on which the frame is adapted to be used with the opening in the frame and sheets aligned with that front viewed surface;

said sheets being sequentially removable to present fresh front surfaces of underlying sheets in the stack and/or to change a decorative patterns on the top sheet on the stack.

8. A composite including:

a frame assembly adapted for use on a device including a front viewed surface of a predetermined shape and a housing having a front surface at least partially around the viewed surface, said frame assembly including:

a stiff frame having generally planar front and rear surfaces, said frame including elongate border portions having inner edge surfaces defining a first opening through the frame adapted to correspond in shape to at least a portion of the front viewed surface of the device on which the frame is adapted to be used;

means adapted for attaching the rear surface of the frame along the from surface of the housing of the device on which the frame is adapted to be used with the opening in the frame aligned with the front viewed surface of the device on which the frame is adapted to be used; and a layer of repositionable pressure sensitive adhesive adhered to said frame and having an attachment surface accessible along the front surface of the frame adapted to have sheets of paper and other objects releasably adhered thereto; and a second assembly, said second assembly including:

a stiff supplemental plate having generally planar front and rear surfaces, said supplemental plate having outer edge surfaces adapted to lay edge to edge with said inner edge surfaces of said border portions;

means adapted for attaching the rear surface of the supplemental plate along a surface of a substrate; and a layer of repositionable pressure sensitive adhesive adhered to said supplemental plate and having an attachment surface accessible along the front surface of the supplemental plate adapted to have sheets of paper and other objects releasably adhered thereto; and means for releasably attaching said supplemental plate to said frame with said front surfaces of said supplemental plate and said frame generally co-planar, and said outer edge surfaces of said supplemental plate laying edge to edge with said inner edge surfaces of the frame.

9. A composite according to claim 8 wherein said frame is adapted for use on the device when the viewed surface of the device is rectangular and has a predetermined width, and said frame has three elongate border portions disposed in a generally U-shaped pattern with the inner edge surfaces of the three border portions defining said first opening through the frame, said first opening being generally U-shaped and having a predetermined width adapted to generally correspond to or to be slightly wider than the width of the front viewed surface of the device on which the frame is adapted to be used.

10. A composite according to claim 8 wherein said frame is adapted for use on the device when the viewed surface of the device is rectangular and has a predetermined width and height, said frame having four elongate border portions disposed in a generally rectangular pattern with the inner edge surfaces of the border portions defining a generally rectangular first opening through the frame of a predetermined width and height adapted to generally correspond to or to be slightly larger than the width and height of the front viewed surface of the device on which the frame is adapted to be used.

11. A composite according to claim 8 wherein said layers of repositionable pressure sensitive adhesive are adhered along the front surfaces of the frame and supplemental plate and extend over the entire front surfaces of the frame and the supplemental plate.

12. A composite according to claim 8 wherein said layers of repositionable pressure sensitive adhesive are adhered along the front surfaces of the frame and supplemental plate and extend over only predetermined portions of the front surfaces of said frame and said supplemental plate.

13. A composite according to claim 8 wherein said frame and supplemental plate comprise outer layers providing said front surfaces of the frame and supplemental plate, said outer layers have back surfaces opposite said front surfaces and have through openings, said frame and supplemental plate comprise recessed layers attached along said back surfaces and extending across said through openings of said outer layers, and said layers of repositionable pressure-sensitive adhesive are on the portions of said recessed layers extending across the openings.

14. A composite according to claim 13 wherein said openings through said outer layers are disposed in a decorative pattern along said front surfaces, and said front surfaces of said frame and said supplemental plate and said recessed layers or layers of pressure sensitive adhesive extending across said openings are of different colors.

15. A composite according to claim 8 wherein said frame assembly and said second assembly each further comprise:

a plurality of sheets having front and rear major surfaces;

decorative patterns on the front surfaces of said sheets; and layers of repositionable pressure sensitive adhesive coated on the front surfaces of said sheets over said decorative patterns;

said sheets are adhered together in a stack with the sheets aligned and with rear surfaces of sheets in the stack removably adhered to the layers of repositionable pressure sensitive adhesive on the sheets; and the rear surface of the bottom most sheet in the stack is releasably adhered to the repositionable pressures sensitive adhesive on the front surface of the frame or supplemental plate;

said sheets are sequentially removable to present fresh layers of repositionable pressure sensitive adhesive on the sheets in the stack and/or to change the decorative pattern on the top sheet on the stack, 16. A composite according to claim 15 wherein said decorative patterns on said sheets are different.

17. A composite according to claim 15 wherein successive decorative patterns on said sheets in said stacks relate to successive events and/or seasons of the year.

18. A composite according to claim 8 further including a layer of transparent material attached to said frame and extending across one of the surfaces of said supplemental plate, said layer of transparent material including at least one means selected from the group consisting of;

means for restricting glare along the front viewed surface of the device on which the frame is adapted to be used;

means for improving contrast along the front viewed surface of the device on which the frame is adapted to be used;

means for reducing static electricity along the front viewed surface of the device on which the frame is adapted to be used;

means for blocking certain types or radiation along the front viewed surface of the device on which the frame is adapted to be used; and means for restricting viewing information displayed along the front viewed surface of the device on which the frame is adapted to be used at angles other than generally a right angle to that viewed surface.

19. A composite according to claim 8 wherein said supplemental plate includes at least three elongate border portions disposed in a generally U-shaped pattern and having inner edge surfaces, said inner edge surfaces being adapted to define an opening through the supplemental plate of a predetermined width; and said composite further includes an insert having generally planar front and rear surfaces, said insert having outer edge surfaces adapted to lay edge to edge with said inner edge surfaces of the border portions of said supplemental plate; and means for releasably attaching said insert to said supplemental plate with said front surfaces of said supplemental plate and said insert generally co-planar, and said outer edge surfaces of said insert laying edge to edge with said inner edge surfaces of said supplemental plate.

20. A composite according to claim 19 wherein said supplemental plate includes a fourth border portion, said border portions of said supplemental plate are disposed in a rectangular pattern, and the inner edge surfaces of the border portions of said supplemental plate define a rectangular opening through the frame of a predetermined size.

21. A composite according to claim 19 further including means adapted for attaching the rear surface of the insert along a surface of a substrate; and a layer of repositionable pressure sensitive adhesive adhered to said insert and having an attachment surface accessible along the front surface of the insert adapted to have sheets of paper and other objects releasably adhered thereto.

22. A composite according to claim 8 wherein said supplemental plate includes at least three elongate strip portions having generally planar front and rear surfaces, said strip portions having outer edge surfaces adapted to lay edge to edge with each other and with said inner edge surfaces of the border portions; said means adapted for attaching is adapted to attach the rear surfaces of each of the strip portions along a surface of a substrate; and said layer of repositionable pressure sensitive adhesive adhered to said supplemental plate extends across each of said strip portions and has an attachment surface accessible along the front surface of each of the strip portions adapted to have sheets of paper and other objects releasably adhered thereto.

23. A composite according to claim 8 wherein said frame is slit at least once around said inner edge surfaces defining said first opening through the frame to define outer edge surfaces defining a larger opening than said first opening; and said frame further includes means for separably attaching the portion of the frame around said outer edge surfaces and the portion of the frame between said outer edge surfaces and said inner edge surfaces, thereby affording the forming of different size openings in the frame to afford adapting the frame assembly to devices having different sized viewed surfaces.

* * * * *

UNITED STATES PATENT AND TRADEMARK OFFICE
CERTIFICATE OF CORRECTION

PATENT NO. : 5,549,267
DATED : August 27, 1996
INVENTOR(S) : Armbruster, et al.

It is certified that error appears in the above-indentified patent and that said Letters Patent is hereby corrected as shown below:

Column 5, line 20, after "Computer Filters" delete 0.

Column 11, line 67, "from" should read -- front --.

Column 12, lines 41 and 51, "from" should read -- front --.

Column 13, line 9, "from" should read -- front --.

Signed and Sealed this

Twenty-fourth Day of June, 1997

*Attest:*

*Attesting Officer*

BRUCE LEHMAN

*Commissioner of Patents and Trademarks*